E. GAIRING.
GAGE FOR FLOATING TOOL HOLDERS.
APPLICATION FILED MAR. 27, 1919.

1,311,961.

Patented Aug. 5, 1919.

Witness
A. J. Stenner

Inventor
Emil Gairing
By J. E. Thomas
Attorney

UNITED STATES PATENT OFFICE.

EMIL GAIRING, OF DETROIT, MICHIGAN, ASSIGNOR TO THE GAIRING-NEEDHAM TOOL CO., INC., OF DETROIT, MICHIGAN, A CORPORATION OF MICHIGAN.

GAGE FOR FLOATING-TOOL HOLDERS.

1,311,961.     Specification of Letters Patent.     Patented Aug. 5, 1919.

Original application filed May 31, 1918, Serial No. 237,615. Divided and this application filed March 27, 1919. Serial No. 285,480.

*To all whom it may concern:*

Be it known that I, EMIL GAIRING, citizen of the United States, residing at Detroit, county of Wayne, State of Michigan, have invented a certain new and useful Improvement in Gage for Floating-Tool Holders, and declare the following to be a full, clear, and exact description of the same, such as will enable others skilled in the art to which it pertains to make and use the same, reference being had to the accompanying drawings, which form a part of this specification.

My invention relates to a gage for a floating tool holder shown in the accompanying drawing and more particularly pointed out in the following specification and claims.

This is a divisional application growing out of the application for patent filed by me on the 31st day of May, 1918, Serial No. 237,615, for a floating tool holder.

The object of the present invention is to provide a gage adapted to be inserted in the tool holder referred to before the insertion of the tool,—the construction being such that the thrust pin of the tool holder may be properly and easily adjusted to receive the shank of the tool designed to be supported thereby,—the gage being adapted to admit the entry of the locking ball carried by the holder to engage the shank of the tool;—thus the parts carried by the tool holder to receive and hold the tool shank may be easily and properly adjusted to receive and lock the tool therein.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made without departing from the spirit of the same.

In the accompanying drawings:—

Fig. 4 is a similar view of the tool indicated in the preceding figure, showing the ball-shaped end of the shank as when viewed at right angles to Fig. 3.

Referring now to the letters of reference placed upon the drawings, A, denotes a socket provided with a tapering shank A'.

B, indicates a taper reamer or other tool, having a shank B', loosely housed in the socket of the holder and provided at its inner end with a ball-shaped or convex end B². C, indicates a short longitudinal groove in the periphery of the ball-shaped end of the shank, from which opens a transverse peripheral groove D, having a slight upward inclination as indicated in Fig. 4 of the drawings:—forming a sharply rounded and downwardly directed corner E, between the longitudinal and upwardly directed transverse grooves to more effectually retain the ball when in its locked relation.

F, indicates a downwardly directed inclined hole bored from the shoulder in the member A, toward its socket in which is lodged a ball G, which partially seats itself in the longitudinal groove C, of the tool shank and gage when the latter is inserted in the holder.

F', indicates a plug for closing the upper end of the hole F.

H, indicates an inclined hole of relatively small diameter extending upwardly from the lower edge of the socket member A, and opening into the hole F, directly below the seat of the ball G. I, indicates a spring in the hole H, which serves to slightly lift the ball from its seat. I', indicates a plug for closing the lower end of the hole H, against which the spring bears.

J, denotes a thrust pin having a concave head J', adapted to receive and articulate with the convex or bell-shaped end B², of the shank of the tool B.

The stem J², of the thrust pin has a screw-threaded engagement with the shank A', of the holder and is divided longitudinally for a portion of its length as indicated at J³, and is sprung apart sufficiently to provide resilient action that it may maintain its position in the holder against accidental displacement when manually adjusted.

K, indicates a collar embracing the ends of the stem J². J⁴, is a kerf cut in the concave head J', of the thrust pin to receive the blade of a screw driver for the purposes of adjustment.

L, denotes a gage or templet of tubular form having a convex or arc-shaped end adapted to register with the concave end of the thrust pin and with longitudinal and transverse grooves C, and D, similar to those on the ball-shaped end of the tool shank.

Figure 2:
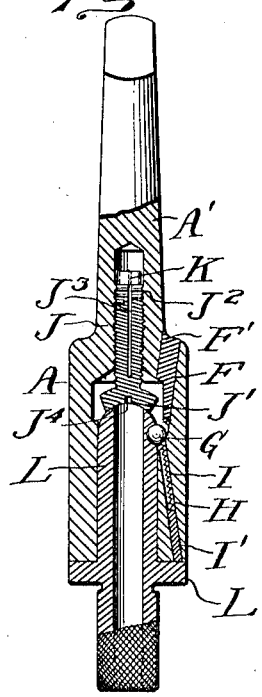
Fig. 2 is a similar sectional view of the holder with a coöperating gage or templet lodged in the socket of the holder that the thrust pin of the holder may be properly positioned to receive the end of the tool shank when inserted therein.
Figure 3:
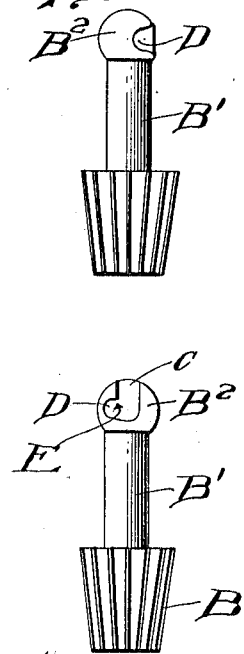
Fig. 3 is an elevation of a taper reamer showing the ball-shaped end of its shank portion as viewed from one side.
Figure 5:
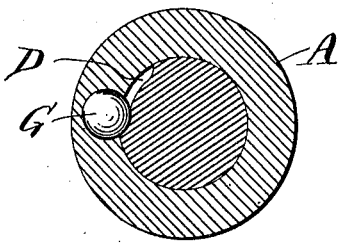
Fig. 5 is a cross-sectional view through the holder and tool shank, (on a relatively larger scale) showing the locking ball as on first entering the longitudinal groove in the ball-shaped end of the tool shank and gage.
Figure 6:
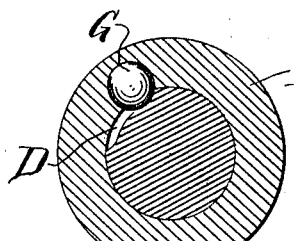
Fig. 6 is a similar cross-sectional view through the holder and tool shank, showing the position of the ball upon locking the tool and gage in the holder.
Figure 7:
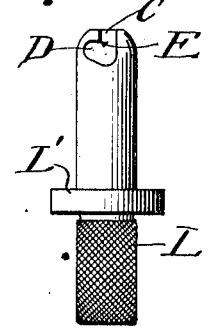
Fig. 7 is an elevation of the gage removed from the holder.

L', is a flange or collar projecting from the body of the gage adapted to bear against the end of the tool-holder (as shown in Fig. 2) thus serving as a guide for the adjustment of the thrust pin,—which may be properly positioned by means of a screw driver inserted through the tubular body of the gage.

It will now be evident that upon a proper adjustment of the thrust pin with the co-operation of the gage that the pin will be in position to articulate with the end of the tool when inserted in the holder;—and that the grooves in the convex end of the tool shank will also be in position to co-ordinate with the ball in the holder to secure the tool therein.

It will be noted that the shank of the tool is of relatively smaller diameter than the bore of the holder, to admit of a limited universal movement of the tool in the holder;—the convex end of the tool shank and the concave end of the thrust pin, with which it articulates, permitting the tool to adjust itself to the work while in locked or driving relation with the holder by means of the ball G.

Figure 1:
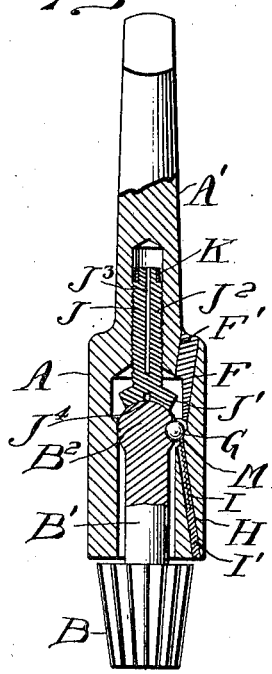
Figure 1 is a longitudinal central sectional view of the holder with a taper reamer in position, showing parts in elevation.

In order that the tool may be free to tilt in any direction and still be secured by the ball in driving relation with the holder, the horizontal axis of the locking ball and the horizontal axis of the ball-shaped end of the tool shank should be in alinement when in locked relation to the holder thereby leaving a slight clearance M, below the ball in the bore formed in tool holder, as indicated in Fig. 1. The spring I, which bears directly against the ball serves to lift it slightly from its seat in the holder, and thus when the tool tilts the ball will not bind against the seat in the holder, but will admit of the tool shank tilting in any direction.

The gage L, which is provided with grooves to receive the ball G, when inserted in the holder is given a slight rotation drawing the ball down to its seat against the action of the spring I, leaving no clearance beneath the ball, as indicated in Fig. 2. The distance from the axis of the groove D, to the end of the gage is slightly longer than between the same points on the tool shank, therefore when the thrust pin J, has been adjusted to articulate with the end of the gage L, it will be found that when the tool shank has been inserted in place of the gage that a clearance has been provided for under the ball, and the latter lifted under the action of the spring I, sufficiently to admit of a tilting movement of the tool as previously explained.

What I claim is:—

1. In a device of the character described, a tool holder having a socket adapted to receive a tool shank, a ball lodged in the tool holder, an adjustable thrust pin threaded into the holder and having a concave head with a kerf to receive a screw driver for purposes of adjustment, and a removable tubular sleeve or gage arranged in the holder and having a projecting flange to limit the extent of its entry into the said holder, and said sleeve having a grooved and rounded end to fit the concave head of the said thrust pin whereby the thrust pin may be adjusted to articulate with the sleeve, said sleeve being also provided with a groove to receive the said ball and the latter being adapted to lock the sleeve holder without interfering with the articulating movement of the said sleeve.

2. In a device of the character described, a tool holder having a socket to receive a tool shank, a ball lodged in a bore in the tool holder adapted to engage the shank of a tool having coöperating grooves to receive the ball, an adjustable thrust pin screwed into the holder having a concave head with a kerf to receive a screw driver for purposes of adjustment, and a removable tubular sleeve or gage, adapted to enter the holder having a projecting flange to limit the extent of its entry into the holder, said tubular gage having a grooved and rounded end corresponding with the end of the tool shank whereby the concave head of the thrust pin may be adjusted to articulate therewith and the ball in the socket member, to enter the grooves, and whereby said parts may be thus properly adjusted to articulate with the end of the tool shank, and for receiving the locking ball.

In testimony whereof, I sign this specification in the presence of two witnesses.

EMIL GAIRING.

Witnesses:
S. E. THOMAS,
JOHN CONSIDINE, Jr.